April 25, 1961 H. E. RUEHLEMANN 2,981,890

TIMING DEVICE WITH A COLD CATHODE DIODE STABILIZATION ARRANGEMENT

Filed April 4, 1951 4 Sheets-Sheet 1

INVENTOR.
H. E. RUEHLEMANN

BY G. D. O'Brien
R. M. Hicks

ATTYS.

VOLTAGE ACROSS CAPACITOR 11

VOLTAGE ACROSS DIODE 15

VOLTAGE ACROSS CAPACITOR 17

VOLTAGE ACROSS RESISTOR 21

CAPACITOR 17 CHARGING

CAPACITOR 17 DISCHARGING

INVENTOR.
H. E. RUEHLEMANN
BY G. D. O'Brien
R. M. Hicks
ATTYS.

INVENTOR.
H. E. RUEHLEMANN
BY
G. D. O'Brien
R. M. Hicks
ATTYS.

INVENTOR.
H. E. RUEHLEMANN
BY
G. D. O'Brien
R. M. Hicks
ATTYS.

2,981,890

TIMING DEVICE WITH A COLD CATHODE DIODE STABILIZATION ARRANGEMENT

Herbert Ernst Ruehlemann, Silver Spring, Md., assignor to the United States of America as represented by the Secretary of the Navy Filed Apr. 4, 1951, Ser. No. 219,302

5 Claims. (Cl. 328—72)

(Granted under Title 35, U.S. Code (1952), sec. 266)

This invention relates generally to the art of electrical timing mechanisms and more particularly to that of electric time fuzes of the self-stabilizing type for use in ordnance equipment.

It is well known to use cold cathode diodes to stabilize the voltage in various types of electric devices such, for example, as electric time fuzes by stabilizing the voltage to a value equal to the main gap sustaining voltage of the diode and nearly equal to the extinguishing potential thereof.

Normally, such fuzes need four components each of which influences the accuracy of the time measurement, these components consisting of a power supply, capacitors, resistors, and a cold cathode diode. In one specific example of such a time mechanism which is used in a projectible and in which an accuracy of ±150 milliseconds is desirable at a maximum time of flight of 30 seconds, the time fuze must have an accuracy of ±0.5%. Since the aforementioned components influence the accuracy of time measurement, each component must have an accuracy of ±0.125%. Such an accuracy appears to be possible of attainment for capacitors, resistors and power supply arrangements, but is extremely difficult, if not impossible, to accomplish for cold cathode diodes. It is readily apparent, therefore, that it is the cold cathode diode in such fuze circuits which introduces inaccuracy into the measurement of time intervals.

The time fuzes which have heretofore been used have not proved entirely satisfactory in all conditions of service because of the difficulty which has been experienced in obtaining small tolerances in the breakdown voltage of different diodes. Furthermore, the value of breakdown voltage not only varies within each diode during the measurement of time intervals but also changes as a function of aging during storage. Furthermore, the breakdown voltage of every diode changes each time it is fired. Although it is possible to compensate for the difference in breakdown voltages betwen different diodes, a compensation for the change in breakdown voltages which occur during measurements, aging and firing has not been successfully accomplished. It is not possible under present-day techniques involving mass production methods to consistently manufacture cold cathode diodes which have a tolerance of less than ±3 to 4 volts and in which each tube is capable of repeating its operation with a tolerance of less than ±.15 volt.

The aforementioned manufacturing difficulties result in high time errors when a timing mechanism employing cold cathode diodes is set for long time periods. Further, electric time measuring circuits employing diodes and in which the accuracy of the time measurement is partially dependent upon breakdown voltage of the diode require extremely high applied voltages in those situations in which it is desired that an electric time fuze having a large range of time settings be provided.

According to the stabilizing method and arrangement of the present invention, voltage in excess of the breakdown potential of a cold cathode diode is applied to the anode thereof from a normally charged condenser, and portions of the energy in this condenser are passed in a series of steps or relaxation cycles to an RC network in the cathode circuit of the diode as the diode is alternately rendered conducting and non-conducting during these steps, the diode being extinguished as the capacitor potential of the RC network increases during each step to a value sufficient to reduce the anode-cathode potential below the main gap sustaining voltage of the diode and the diode again being rendered conducting when the potential on the capacitor of the RC network has discharged therein to a value sufficient to increase the anode-cathode potential to a value in excess of the breakdown potential of the diode. When a sufficient number of steps have been taken to reduce the potential on the anode connected capacitor to a value just below the breakdown potential of the diode, no further steps are taken and the capacitor potential is then stabilized at the breakdown potential of the tube.

In utilizing this stabilizing arrangement in an electric timing circuit, the potential stabilized capacitor is arranged in series in the main gap crcuit of the diode with two additional normally charged capacitors. One of these additional capacitors is charged to a potential in excess of the potential on the other of these capacitors and in opposing relation to the other two capacitors which are arranged series aiding. The aforesaid one of the additional capacitors provides the timing function of the circuit and for this purpose has a resistive discharge path for reducing the potential thereof to a value just below the potential of the aforesaid other one of the additional capacitors. When this occurs, the combined potential of the series aiding capacitors exceeds the potential of the opposing capacitor by an amount in excess of the breakdown potential of the diode and the diode is rendered conducting, the electron discharge at this time being arranged to pass through a utility device such for example, as a fuse whereby the fuse is fired.

By reason of this arrangement, it will be apparent that the time measurement is a fixed period which is dependent only upon the RC timing circuit and the division of voltage between the series aiding capacitors and is independent of variations in breakdown potential of the diode, the circuit being stabilized at the breakdown potential of the particular diode being used in any case. It will also be apparent that the fixed period will be the same in different circuits provided that the potential ratio of the series aiding capacitors is maintained constant.

Accordingly, an object of the present invention is the provision of a new and improved electric time fuze circuit which employs a diode stabilizing device in order that the selected time will be independent of both the drift and the value of the breakdown voltage of the diode.

Another object of the instant invention is to provide a novel and improved electric fixed-period timing circuit which is independent of applied stabilizing voltages and which includes a cold cathode diode tube.

Still another object is the provision of a new and novel electric fixed-period timing circuit which is dependent only upon the maintenance of a constant ratio of two applied potentials.

An additional object of the invention resides in a novel and improved electric timing mechanism of the cold cathode diode type whereby a high rate of voltage rise at the diode is accomplished for long time settings and which can be easily compensated and adjusted.

Other objects and many of the attendant advantages of this invention will be readily appreciated as the same becomes better understood by reference to the following detailed description when considered in connection with the accompanying drawings wherein.

Figure 2:
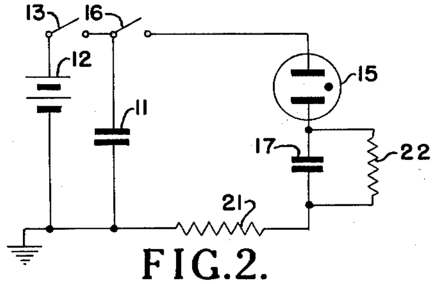
Figure 10:
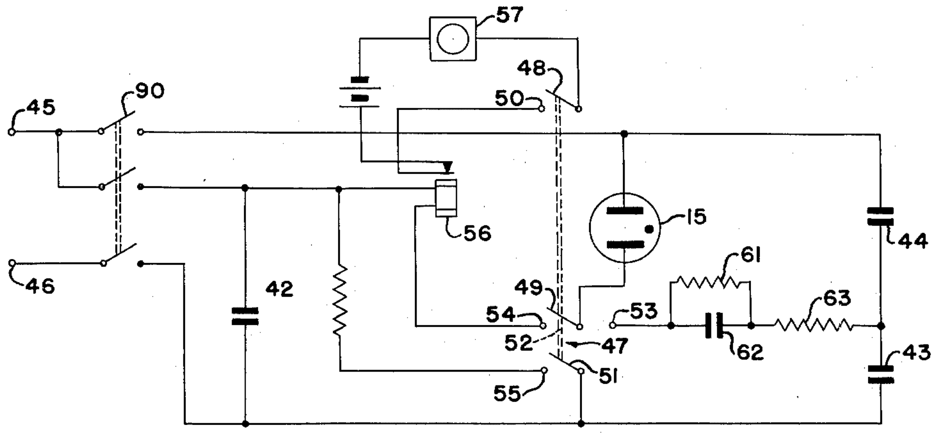
Figure 11:
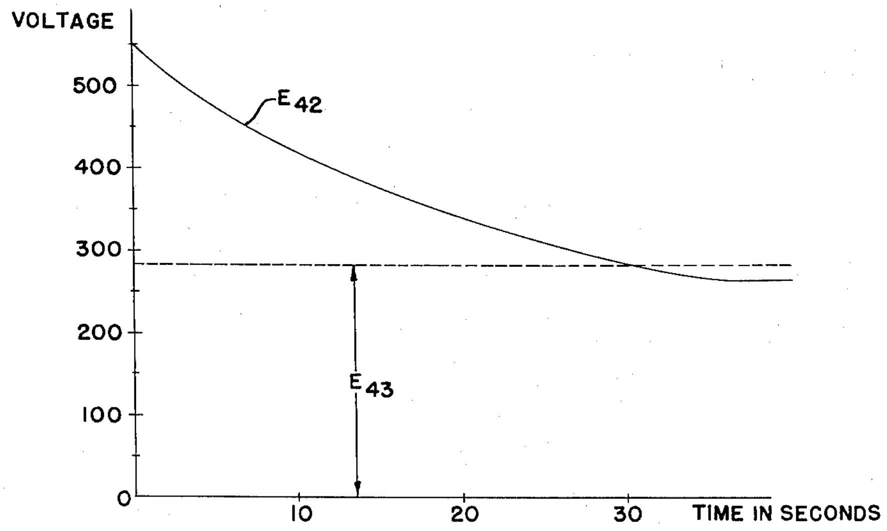
Figure 12:
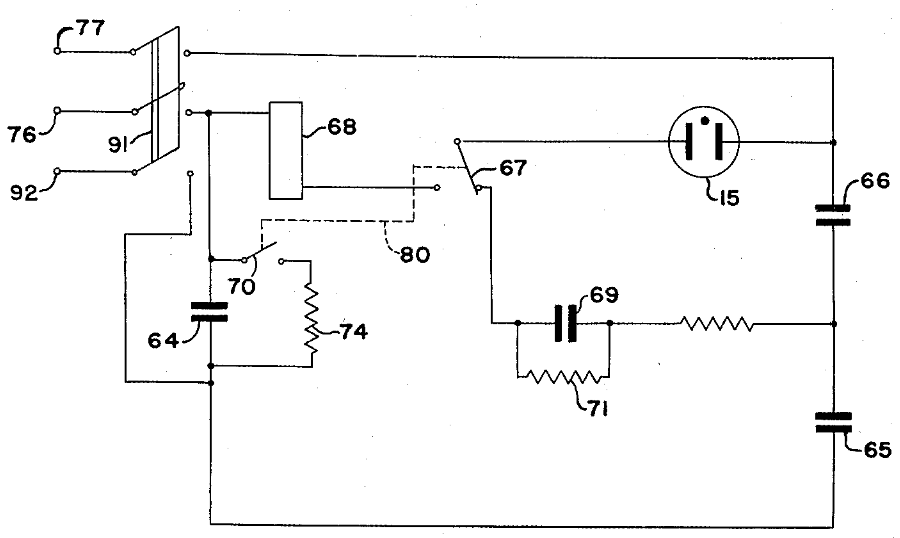
Figure 13:
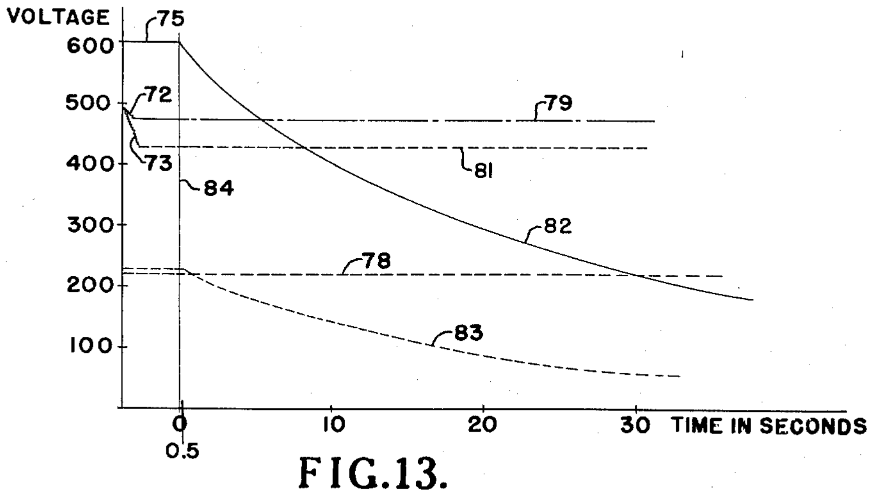

Figs. 9*a*–9*d* are diagrammatic showings of the voltage-time diagrams for the various components shown in Fig. 2 as these components operate through successive cycles;

Fig. 10 is a diagrammatic illustration of a self stabilizing timing circuit in accordance with one form of my invention and which is suitable for use in time-measuring instruments;

Fig. 11 is an illustration in graphical form of the operating characteristics of the circuit of Fig. 10;

Fig. 12 diagrammatically illustrates a timing circuit of the self stabilizing type in accordance with another embodiment of the instant invention and which is particularly useful in ordnance time fuzes; and Fig. 13 graphically illustrates the operational characteristics of the circuit of Fig. 12.

Figure 1:
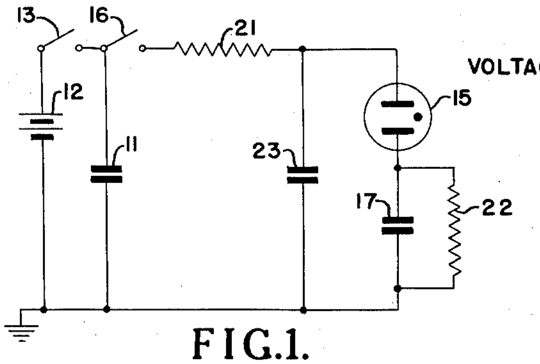
Figs. 1–4 are diagrammatic showings of various self stabilization circuits for reducing a capacitor voltage to a value which is smaller by an extremely small amount than the breakdown potential of the cold cathode diode connected thereto in accordance with the instant invention.
Figure 5:
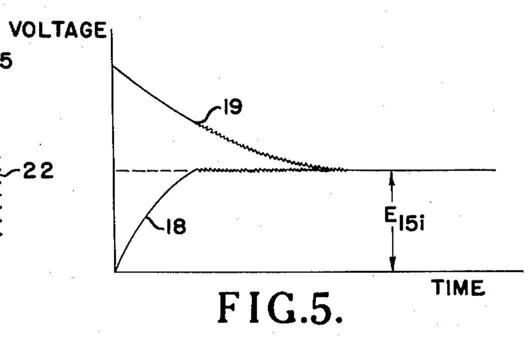
Figs. 5–8 are magnified graphical showings of one cycle of the operational characteristics of the circuits of Figs. 1 through 4, respectively.

Referring now to the accompanying drawings in which like reference numerals are employed to designate like parts, and more particularly to Figs. 1 and 5 thereof in which reference numeral 11 designates a capacitor which is charged by applying a voltage from a bettery 12 when switch 13 is closed, this voltage being higher than the breakdown voltage $E_{151}$ of the cold cathode diode tube 15. When switch 16 is closed and switch 13 is opened, the voltage on capacitor 11 charges capacitor 23 to a value equal to the breakdown voltage $E_{151}$ of tube 15 as shown at 18 in Fig. 5, and capacitor 11 is thereafter discharged to the value of the breakdown voltage $E_{151}$ of the tube as designated by numeral 19, Fig. 5. The operation of the remainder of the circuit shown in Fig. 1 will be readily understood by reference to the description of the operation of the circuit of Fig. 2 which will now be described in detail and which operation is substantially identical in certain respects with that of Fig. 1.

Figure 6:
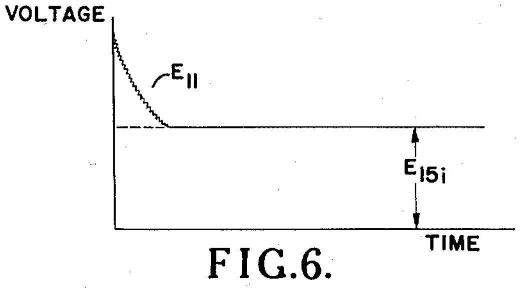
Figures 9A, 9B, 9C, 9D, 9E:
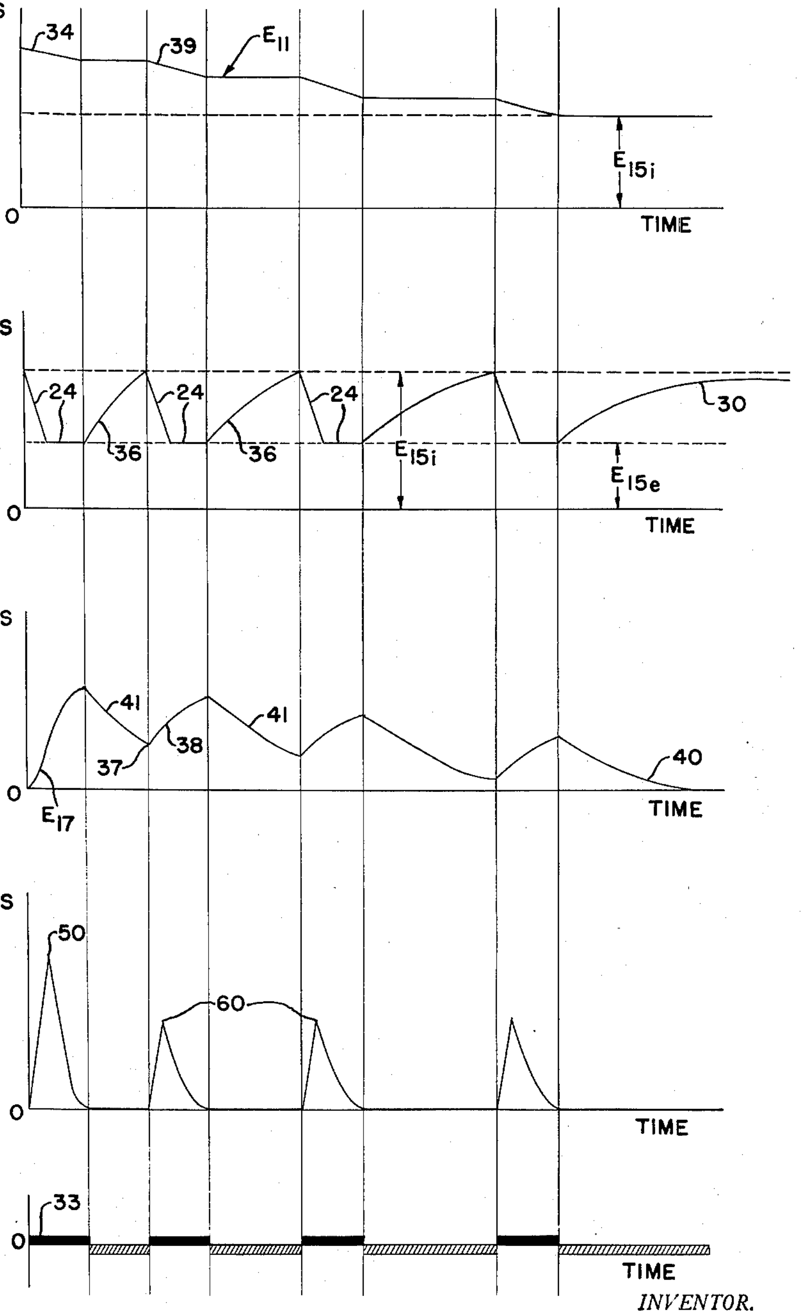

When switch 16 is closed, the tube 15 breaks down under voltage $E_{11}$ on capacitor 11, Figs. 6 and 9*b*, which is larger than the breakdown or ignition potential $E_{151}$ of the tube. As a result of the conduction of the tube, as indicated at 24, Fig. 9*b*, capacitor 17 will be charged, as graphically shown by numeral 33 in Fig. 9*e* and $E_{17}$ in Fig. 9*c*, from capacitor 11, as indicated at 34 in Fig. 9*a*, with a time constant equal to and mathematically represented by the following equation:

$$\Delta t_1=\frac{C_{11}C_{17}}{C_{11}+C_{17}}(R_{21}+R_{22})$$

where $C_{11}$ equals the capacitance of capacitor 11; $C_{17}$ equals the capacitance of capacitor 17; $R_{21}$ equals the resistance of resistor 21; $R_{22}$ equals the resistance of resistor 22; and where $R_{22}$ is greater than $R_{21}$. Charging of capacitor 17 causes the voltage across tube 15 to drop until the tube is extinguished. This occurs when the voltage $E_{17}$ on capacitor 17 reaches the value $E_{17}=E_{11}-E_{15e}$, and any further charging of capacitor 17 is interrupted, the extinguishing potential of tube 15 being represented in this equation by $E_{15e}$. The first drop in the voltage of capacitor 11 may be expressed by the following equation:

$$\Delta E_{11(1)}=E_{11(1)}-E_{11(2)}=(E_{11(1)}-E_{15e})\frac{C_{17}}{C_{11}+C_{17}}$$

where $E_{11(1)}$=initial voltage of $E_{11}$ which is higher than the breakdown voltage of tube 15; and $E_{11(2)}$=the voltage on capacitor 11 at termination of first discharge. At this time capacitor 17 discharges through resistor 22 with a time constant which may be mathematically represented by the following equation:

$$t_2=C_{17}.R_{22}$$

The voltage $E_{17}$ on capacitor 17 is indicated by the curve in Fig. 9*c*. When the capacitor discharges through resistor 22 as indicated at 41 in Fig. 9*c*, the potential difference across the diode is increased as indicated at 36 in Fig. 9*b*. The tube 15 will break down again should the voltage at capacitor 17 drop to the value 37, Fig. 9*c*, which value may be mathematically expressed by the following equation:

$$E_{17}=E_{11}-E_{15i}=E_{11(1)}-(E_{11(1)}-E_{15e})\left(\frac{C_{17}}{C_{11}+C_{17}}\right)-E_{15i}$$

thereby permitting the capacitor 17 to be recharged as shown at 38, Fig. 9*c*. During this recharging of capacitor 17, the capacitor 11 is discharged, as shown at 39 in Fig. 9*a*, with the time constant $t_1$, hereinbefore defined. Further charging of capacitor 17 is interrupted when the tube 15 is again extinguished as a result of the voltage at capacitor 17 becoming equal to the difference between the then existing voltages present at capacitor 11 and the extinguishing voltage of the tube 15, respectively. It will be clearly apparent that the voltage in capacitor 11 has, at this time, dropped from its $E_{11(2)}$ value and that the potential difference between the peaks of the curve in Fig. 9*c* represents the respective voltage drops across capacitor 11. The second potential drop in condenser 11, represented by numeral 39 in Fig. 9*a*, may be mathematically expressed by the following equation:

$$\Delta E_{11(2)}=E_{11(2)}-E_{11(3)}=E_{1(1)}-\Delta E_{11(1)}-E_{15e})\frac{C_{17}}{C_{11}+C_{17}}$$

$$=(E_{11(1)}-E_{15e})\left(\frac{C_{11}}{C_{11}+C_{17}}\right)\left(\frac{C_{17}}{C_{11}+C_{17}}\right)$$

where $E_{11(2)}$=the voltage on capacitor 11 at the beginning of the second voltage drop; and $E_{11(3)}$=the voltage on capacitor 11 at the end of the second voltage drop.

Expressed differently, every ignition of the diode 15 causes the voltage in capacitor 11 to decrease by a small amount which is dependent upon the ratio of capacitances between capacitors 11 and 17. The capacitor 17 again discharges through the resistor 22, and tube ignition reoccurs when the voltage at capacitor 17 equals the difference between the voltage at capacitor 11 for this cycle and the voltage required for igniting tube 15. These cycles of operation during which the capacitor 17 is sequentially discharged are repeated until the voltage in capacitor 11 is equal to or slightly less than the ignition or breakdown voltage of tube 15 with the time required for each cycle becoming greater as the voltage on capacitor 17 decreases. When the voltage on capacitor 11 is equal to the breakdown potential of tube 15, the capacitor 17 can then discharge to zero, as shown at 40, Fig. 9*c*, and no further ignition will occur as illustrated by curve portion 30 which rises toward but does not reach the level of ignition voltage $E_{151}$, Fig. 9*b*, and the circuit is stabilized at this moment. The voltage across resistor 21 is graphically illustrated in Fig. 9*d* wherein the peak 50 is equal to the difference between the applied voltage, which is higher than the breakdown potential of tube 15, and the extinguishing potential of tube 15. The remaining peaks 60 in Fig. 9*d* represent voltages equal to the difference between the igniting and extinguishing potentials of tube 15.

Although, the circuits illustrated in Figs. 1–4 function in substantially the same manner, it will be observed that these various forms of the instant invention differ in certain operating characteristics thereof, as is graphically represented in Figs. 5–8. More specifically, as hereinbefore stated, the voltage on capacitor 23 in Fig. 1 rises, as represented by the curve 18 in Fig. 5, only to a value equal to the ignition or breakdown potential of tube 15.

Figure 3:
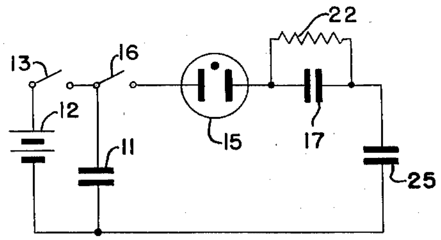
Figure 7:
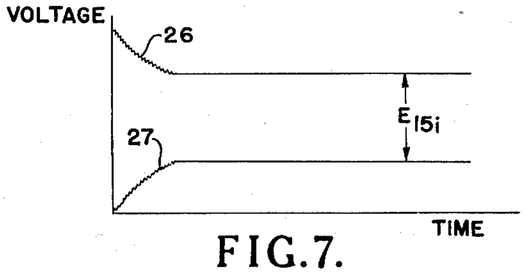
Figure 8:
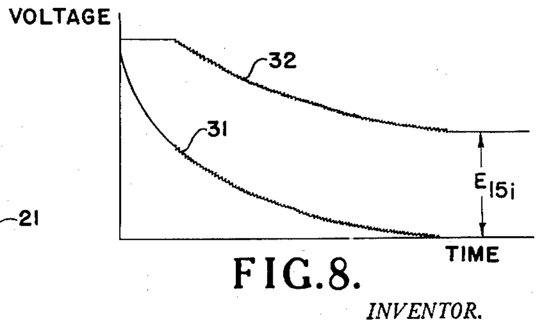
Figure 4:
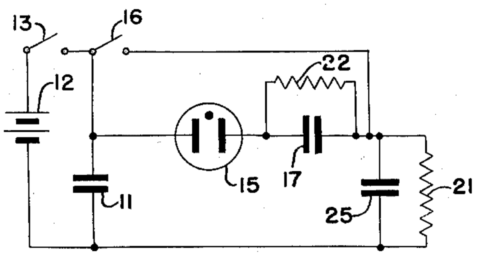

The voltage on capacitor 11, Fig. 2, drops from a high value to the value of the breakdown voltage $E_{151}$ of tube 15, this drop being denoted by the curve $E_{11}$, Fig. 6. In Fig. 3 the capacitor 11, when charged, transfers a charge to a second capacitor 25 connected in series therewith through tube 15 until the potential difference between the charges on these capacitors is equal to the breakdown voltage of the tube 15, the discharge of capacitor 11 and charge of capacitor 25 being represented by the curves 26 and 27, respectively, and the potential difference therebetween being denoted by $E_{151}$, Fig. 7. In Fig. 4, capacitors 11 and 25 are both initially charged to an equal value whereupon the charge on capacitor 25 leaks off through resistor 21 until the potential difference between the capacitors 11 and 25 is equal to the breakdown voltage of tube 15. Capacitor 11, Fig. 4, will then begin transferring charge through the tube 15. Thereafter, the potential difference $E_{151}$ between the voltage on capacitor 25, designated by the curve 31 in Fig. 8, and the voltage on capacitor 11, represented by the curve 32 in Fig. 8, will remain constant and equal to the breakdown voltage of tube 15. The jagged or stepped portions of the curves illustrated in Figs. 5–8 graphically represent in greatly magnified form the successive cycles or steps of discharging and charging of the particular capacitors represented thereby and shown in Figs. 1–4.

Obviously, many similar circuits may be designed without departing from the inventive concept of the instant invention. Such circuitry causing cyclic charging and discharging of the stabilizing capacitor 17 employed in these figures is capable of advantageous employment in electric timing devices for the reason that the difficulties experienced heretofore in using cold cathode diodes are obviated by entirely eliminating the inaccuracies in time measurements introduced as a result of differences in the operating characteristics of the diodes such, for example, as during measurements, storage and firing of different diodes.

In the specific form of my invention disclosed in Fig. 10, which includes that form illustrated in Fig. 2, capacitors 42, 43 and 44 are charged with 550 volts from a source of power, not shown, connected to terminals 45 and 46. The voltage in capacitor 44 is then stabilized to the breakdown voltage of tube 15 by closing the switch arm 49 upon contact 53. Switch 47 is provided with switch arms 48, 49 and 51 connected to one another for simultaneous actuation by the connecting link 52. After stabilization has occurred, switch 47 is actuated to bring the switch arms 48, 49 and 51 into conducting relationship with the respective contacts 50, 54 and 55 thereof to thereby start both the discharging of capacitor 42 and the operation of the time cycle. When tube 15 breaks down, capacitors 43 and 44, in series, transfer a pulse charge to capacitor 42 causing the relay 56 to be actuated to open the normally closed contacts thereof and thereby stop timer 57. In this specific example, the circuit constants are selected in such a manner that the tube 15 breaks down after about 30 seconds in which time the rate of voltage rise would be 6.55 volts per second. This circuit possesses certain advantages over timing circuits in prior use, one of such advantages being that although the rate of voltage rise at the ignition or breakdown point varies, the same time period results regardless of variance in applied voltages. This inherent feature of my invention will now be described in greater detail. The ignition circuit of the device shown in Fig. 10 includes capacitors in series with the tube 15 and the voltage on one of these capacitors is fixed at the value of the breakdown or ignition voltage of the tube, this being the voltage on capacitor 44. The curve $E_{42}$ in Fig. 11 represents the voltage on capacitor 42, and the broken line represents the voltage on capacitor 43, the tube breaking down after 30 seconds at which time $E_{42}$ has dropped to the level of $E_{43}$. In the circuit shown in Fig. 10 the capacitor 42 has an initial voltage of $E_{42}$, the capacitor 43 a voltage of $E_{43}$, which is some fixed fraction of voltage $E_{42}$, this fraction being designated as K. Adding the voltages around the ignition circuit which includes capacitor 42, capacitor 43, capacitor 44, diode tube 15, switch arm 49 and contact 54, and relay 56, it will be observed that the summation of these voltages may be represented by the following equation:

$$(E_{42})\left(e-\frac{t}{T}\right)-KE_{42}-E_{44}+E_{151}=0$$

when $E_{44}=E_{151}$ and $T$=the RC time constant $$E_{42}\left(e-\frac{t}{T}-K\right)=0$$

$t$=constant.

Therefore, in the circuit heretofore described and shown in Fig. 10 or in any similar circuit such, for example, as the ones shown in Figs. 1–4, the application of one variable voltage and a stabilization of one capacitor to the breakdown voltage of the cold cathode diode will result in the same time setting for different applied voltages.

The value of resistor 61 is critical since this resistor determines the time constant for the discharging of condenser 62. If the resistor 61 is too small in value, reignition occurs at a time when the tube is still highly ionized and results in a breakdown voltage thereof which is undesirably low. This effect, however, may be compensated by the proper choice of capacitor 62 and is a definite function of the design and characteristics of the tube. In the specific modifications disclosed herein, resistor 63 has a resistance of 220 ohms and capacitor 62 has a capacitance of 70 micro-micro-farads and resistor 61 has a resistance of any suitable value greater than 1 megohm. Under these conditions, the time required for stabilization of the circuit is approximately .16 second where the resistance of resistor 61 is equal to 1 megohm. It will be understood that the stabilization time may also be reduced by applying a voltage on capacitor 44 of such a value that it is only slightly higher than the highest possible breakdown voltage of a diode 15 specifically developed for use in timing mechanisms of the types herein disclosed. Under certain conditions and with the use of certain types of tubes it has been found that the RC circuit illustrated herein produces an accuracy of ±2 milliseconds in 30 seconds or an error of less than ±0.007%.

With an initial voltage of 275 volts in capacitor 44 and with a tube having an ignition voltage of 220 volts, the voltage drop for each step, hereinbefore mentioned, is approximately 0.05 volt. Consequently, 1100 steps are necessary for the device to become stabilized in this situation.

It is apparent that such a circuit as that illustrated in Fig. 10 is particularly suitable for timing mechanisms requiring a high degree of accuracy since this circuit is not only independent of accuracy of applied stabilizing voltage but is also independent of aging and changing breakdown voltage characteristics of the diode.

Any similar circuit such, for example, as that disclosed in Fig. 12 and which is suitable for eliminating the effects of differences in breakdown voltage of different tubes and also the changes in breakdown voltage for any one tube which occur during the course of operation and aging may be used in a time fuze for ordnance equipment.

Referring now to the time fuze circuit disclosed in Fig. 12 which includes a stabilization device, described hereinafter, capacitor 64 is charged to a different voltage for each time setting, and the series condensers 65 and 66 are charged with a constant voltage having a voltage ratio which may be expressed as follows:

$$\frac{E_{65}}{E_{66}}=\frac{\text{Capacitance 66}}{\text{Capacitance 65}}$$

It will be understood that the capacitor 65 can also be directly charged from the same voltage source as are capacitors 64 and 66 and under these circumstances the ratio between the voltages on capacitors 64 and 65 is maintained at a constant value. The voltage at capacitor 66 must be higher than the ignition voltage of the tube 15 for stabilization to be accomplished. The rate of change of voltage on capacitor 64 is constant to the ignition point of the tube 15 for all settings from time zero to the maximum time. The voltage on capacitor 65 is such that when tube 15 ignites the highest possible voltage drop occurs. For this condition to exist the time constant for the discharge of capacitor 64 must be equal to the maximum time setting on the fuze. Under such circumstances the voltage drop for all time settings is inherently constant.

After the capacitors 64, 65 and 66 have been charged, the stabilization device, comprising capacitor 69 and resistor 71 connected in parallel thereacross, is connected by way of switch 67 to capacitor 66 for a short time to discharge this capacitor to the value of the breakdown voltage of the diode. Capacitor 66 is discharged to the breakdown voltage of the diode regardless of the use of different diodes in different fuzes or different diodes in the same fuze.

Considering the operation of the circuit of Fig. 12 in greater detail, a stabilization cycle occurs in which capacitor 66 is charged to a higher value than the breakdown potential of the tube, as hereinbefore mentioned, and causes tube 15 to conduct thereby charging capacitor 69 in a very short time interval of a few microseconds. The increasing voltage in capacitor 69 interrupts conduction after a small amount of charge is transferred from capacitor 66 to capacitor 69, this amount of charge being predetermined and dependent upon the proportion of capacitor 66 to capacitor 69. At this time, capacitor 69 discharges through resistor 71 and tube 15 again conducts to discharge capacitor 66 and charge capacitor 69. This stabilization cycle is repeated many times causing capacitor 66 to be discharged in steps such, for example, as mentioned in connection with the description of Figs. 5–8 and also shown at 72 and 73 in Fig. 13. Capacitor 66 is discharged in this manner until the voltage thereon is lower than the breakdown potential of tube 15 by a very slight amount.

The capacitor components of the stabilization circuit may be of any suitable size such, for example, as capacitor 66 may have a capacitance of 0.1 to 0.2 microfarad and the capacitor 69 a capacitance of 50 to 100 micromicro-farads. Under these conditions, an excess of 50 volts on capacitor 66 over that required for the ignition of tube 15 will necessitate approximately 1000 steps or stabilization cycles to occur for the capacitor 66 to be discharged to the breakdown or ignition voltage of the tube, each step reducing the voltage of capacitor 66 by approximately 0.05 volt, the time required for this discharge being less than one second. After the required discharge of capacitor 66, i.e. at the time of stabilization, it will be obvious, that the charge thereon will never drop below the breakdown potential of the tube by more than 0.05 volt.

At the instant of shooting of a projectile incorporating the device of the instant invention, the capacitor 64 is charged to either a high, medium or low voltage dependent upon whether the desired time of flight is long, medium or short, respectively. Both of the serially connected ignition capacitors 65 and 66 are charged at the same instant as capacitor 64 with the required voltage. This voltage is divided between the two capacitors 65 and 66 in accordance with the reverse proportion of the capacitances, as hereinbefore mentioned, and the stabilization cycles occur. At the time of firing or dropping of the projectile, switch 67 is actuated to disconnect the tube 15 from the stabilization circuit, hereinbefore described, and to connect the tube to the storage capacitor 64. The closure of switch 67 closes switch 70 simultaneously therewith and to which switch 67 is operatively connected as indicated by the broken line 80. At this time capacitor 64 discharges through resistor 74, and ignition of the tube 15 occurs just after the voltage in capacitor 64 has dropped to a value equal to that present in capacitor 65. The time accuracy of the device of Fig. 12 is influenced only by the accuracy of the voltage divider.

Referring now to Fig. 13 which graphically illustrates the operation of the circuit of Fig. 12, if the highest applied voltage is 600 volts as denoted at 75, the time constant of the circuit of Fig. 12 must be equal to the maximum time of flight for which the projectile is to be used for the highest possible voltage drop to occur at the point of ignition of tube 15, and this voltage drop has been determined by tests to be 7.33 volts/second for a maximum time setting of 30 seconds. This voltage drop is constant for all time settings from zero to 30 seconds. The breakdown voltage of 285 volts of tube 15, as employed in the circuits of the instant invention, is no longer limited to a tolerance of ±3 volts as heretofore, but, in contradistinction to the prior art devices, a tolerance of ±95 volts does not adversely affect operation of the invention. Any change in breakdown voltage does not influence the measurement of time intervals provided that the voltage at which the tube will break down lies within the range of 190 to 380 volts. Furthermore, any change in the voltage output of the power supply, not shown, connected to terminals 76, 77 and 92 of Fig. 12 is not important to the successful operation of the invention provided the voltage in capacitor 66 is sufficiently high to enable at least one stabilization cycle to occur.

In Fig. 13 the curve 78 represents the constant reference potential in capacitor 65, Fig. 12. Curve 79 in this figure denotes the breakdown potential of diode 15. Should a diode have a smaller breakdown potential, a curve such, for example, as that denoted by numeral 81 would be obtained. The potential difference between curve 78 and curve 79 or 81, as the case may be, equals the breakdown potential of tube 15. After stabilization has been completed, it is readily apparent that the voltage at this time on capacitor 66 is approximately equal to the breakdown potential of the diode 15, Fig. 12, and being less than this potential by no more than 0.05 volt, as hereinbefore described. Curves 82 and 83 represent the potential on capacitor 64 for long and short time settings, respectively, it being observed that for the long time setting curve 82 intersects curve 78 at 30 seconds and for the short time setting curve 83 intersects curve 78 at approximately 0.5 second. Obviously, any curve or time of detonation may be obtained between zero and the maximum time settings merely by altering the voltage applied to capacitor 64. The voltage axis represents the time of charging the fuze and the zero axis represents the time of firing of the projectile and the time between the two axes must be longer than the time required for stabilization for the reason that different diodes with different breakdown potentials require different times for stabilization and the stabilization must be complete at the time of firing because at that instant switch 67 is actuated to disconnect the stabilization circuit and connect the diode in series with the detonator 68.

It has been found to be advantageous, in some cases, to commence the stabilization in the breech of the gun from which a projectile equipped with a fuze embodying the instant invention is to be fired for the reason that stabilization occurs during a very short time interval such, for example, as 0.1 second. As the projectile leaves the gun barrel, the switch 67, which may be of any suitable type such, for example, as a delayed action inertia switch, is actuated, stabilization having been complete prior to actuation of this switch and the detonator 68 is connected in series with diode 15 so that thereafter, at the end of the selected time interval, the ignition of the diode detonates the projectile. In other cases in which stabilization occurs between the time of firing of the projectile and the actuation of switch 67, stabilization occurs during the entire acceleration of the projectile and, therefore, includes any changes in breakdown potential resulting from firing acceleration. The aforementioned connection between the diode and the detonator enables the storage capacitor 64 to discharge thereby igniting the diode and firing the detonator, as hereinbefore mentioned. The diode will fire when the storage capacitor 64 is discharged to that voltage on capacitor 65 independently of the breakdown potential of the diode by reason of the fact that the required voltage for the ignition of the diode is always available in capacitor 66.

In the circuits of the prior art electric timing devices, the rate of voltage drop at short time settings is very high while the rate of voltage drop at long time settings is low. It is evident that maintaining a constant rate of voltage change at the ignition point of the tube over the entire time range provides the highest possible accuracy over the whole range with any given set of initial conditions. Since the time is a function of the ratio of the voltages on capacitors 65 and 66, respectively, assuming a given value of voltage at terminal 76, the ultimate accuracy of the device may be controlled by a suitable voltage divider network employing capacitors 65 and 66. In use, the device shown in Fig. 12 is connected to a voltage supply and the applied voltage to capacitors 65 and 66 is obtained with such a voltage divider circuit. Any variation in supply voltage would not affect the ratio of these voltages and consequently, the timing would not be dependent upon accuracy of applied voltage. This feature eliminates all difficulties formerly present concerning the design and maintenance of stable and accurate power supplies for field use in time fuze applications.

As hereinbefore described, the circuit of Fig. 12 illustrates an electric time fuze in which the time setting is independent of changes in tube breakdown voltage which may occur during tests, storage, or as a result of various mechanical forces while, concurrently therewith, allowing large delivery tolerances in tube breakdown voltage. Furthermore, this fuze circuit is independent of the accuracy of the two applied charging voltages. The accuracy of the timing device is dependent only upon the ratio between these voltages being maintained at a constant value which results in a voltage supply unit of simple construction.

From the foregoing description it will be apparent to those skilled in the art that various stabilizing circuits have been disclosed in which the voltage on a capacitor is automatically adjusted to a value just below the breakdown voltage of a cold cathode diode tube employed within the circuit.

It will also be apparent that a time fuze circuit which yields accurate time settings which are independent of breakdown voltage of the diode has been disclosed as incorporating a stabilized circuit of the type hereinbefore disclosed in Figs. 1–4. Furthermore, with the circuits herein disclosed the extreme requirements placed upon the cold cathode diodes used in time measuring circuits can be substantially relaxed thereby resulting in a more economical system since large delivery tolerances in breakdown voltages are permissible and changes in the breakdown voltage of the diode as a function of aging, measurements, and firing are not objectionable in the successful operation of the instant invention. Furthermore, expensive checking and compensation of breakdown voltage differences within the fuze circuit are obviated to thereby reduce the cost of assembly of fuzes employing electric time mechanisms.

It will be obvious to those skilled in the art that many modifications are possible which measure constant time intervals independent of applied and breakdown voltages of the diode, in each case, by using such a stabilized circuit as that disclosed herein.

In Figs. 10 and 12 the numerals 90 and 91 respectively designate in diagrammatic form portions of charging gear, not shown, which may be of any well known type suitable for the purpose.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A timer of the character disclosed comprising a pair of terminals connectable at will to a source of power, voltage divider means including first and second capacitors, said first capacitor being connected to one of said terminals and said second capacitor being connected to the other of said terminals, a parallel resistance-capacitance circuit and a cold cathode diode tube connectable at will in series across said first capacitor to provide a discharge path therefor, switch means including ganged first, second and third switch arms, said first switch arm serially connecting said diode into the discharge path of said first capacitor and to said resistance-capacitance circuit when actuated to one position thereof, said first capacitor having a voltage thereon initially exceeding the breakdown potential of said tube whereby sufficient energy is transferred from the first capacitor to said resistance-capacitance circuit through said tube in at least one relaxation cycle of operations thereof to stabilize said first capacitor voltage at the level of said breakdown potential, a third capacitor connected across said terminals, a relay having a pair of normally closed contacts and connected on one side thereof to said one of the terminals and serially connected at will on the other side thereof by said first switch arm to the diode when said first switch arm is actuated to a second position thereof, a resistance connected on one side thereof to said one of the terminals, said second switch arm of said switch means connecting the other side of said resistance to the other of said terminals when the first switch arm is actuated to said second position thereof thereby to cause said third capacitor to discharge therethrough and the diode to next ignite when the potential across the third capacitor falls below the potential across the second capacitor, and an electric timing circuit including the normally closed contacts of said relay and said third switch arm for completing said timing circuit when the first switch arm is actuated to the second position thereof whereby the timing circuit is closed after the tube is stabilized and the timing circuit is opened as the relay operates when the tube is next ignited to thereby measure the interval of time between the actuation of the switch means and said next succeeding ignition of the tube.

2. An electric time fuze of the character disclosed comprising first, second and third terminals connectable at will to a source of power, said first and third terminals and said second and third terminals having first and second voltages of said source respectively applied thereto, a voltage divider connected across said first and third terminals and including a pair of capacitors, a first parallel resistance-capacitance circuit connected between said second and third terminals, a stabilization device connectable at will across one of said pair of capacitors and including a cold cathode tube and a second parallel resistance-capacitance circuit and a switch for serially connecting one side of said tube to said second resistance-capacitance circuit when the switch arm of said switch is in a first position, and a detonator connected between said second one of said terminals and said one side of said tube by way of said switch when the switch arm of said switch has been actuated to a second position thereof after the stabilization device has caused said one of the capacitors to be discharged to a value slightly less than the breakdown potential of the tube whereby the detonator will be fired by energy passed therethrough and transferred from the voltage divider to the first resistance-capacitance circuit upon the next succeeding ignition of the tube.

3. A device of the character disclosed comprising a first parallel resistance-capacitance circuit connectable to a source of power, a voltage divider connectable at will across said first resistance-capacitance circuit and including a pair of serially connected capacitors, stabilizing means connectable at will across one of said capacitors of said voltage divider and including a cold cathode tube and a second parallel resistance-capacitance circuit and switch means connecting said tube to said second resistance-capacitance circuit when said switch means is in a first setting thereof, and electroresponsive means connected by way of said switch means to said tube after said switch means has been actuated to a second setting thereof, said electroresponsive means being connected on the other side thereof to the first resistance-capacitance circuit, said voltage divider being connected across said first resistance-capacitance circuit by way of said tube and said switch and said electroresponsive means when the switch means has been actuated to said second setting thereof.

4. In a device of the character disclosed, a voltage divider including a pair of serially connected capacitors and connectable across a source of voltage, a cold cathode tube and a stabilization circuit therefor including a parallel resistance-capacitance circuit connected in the discharge circuit of said tube and connectable at will across one of said capacitors, and a utilization circuit selectively connectable across the other of said capacitors and including said tube and electroresponsive means serially connectable at will to said tube for operating the electroresponsive means when the tube has been stabilized.

5. A device of the character disclosed comprising first and second capacitors connectable in series across a source of voltage, a cold cathode diode tube, means including a parallel resistance-capacitance circuit serially connected to said tube and to said first capacitor for successively causing the tube to conduct during a first time interval until the voltage on said first capacitor is insufficient by a slight amount to cause further ignition of the tube, and a utilization circuit including a second parallel resistance-capacitance current, means for connecting said second capacitor in series with said second resistance-capacitance circuit, said tube, and an electroresponsive device, said electroresponsive device being operable by the charge on said second capacitor as the second capacitor discharges through said tube at the end of a second predetermined time interval, said last named time interval being dependent only upon the division of voltage between said first and second capacitors and the time constant of the second resistance-capacitance circuit.

References Cited in the file of this patent

UNITED STATES PATENTS

| | | |
|---|---|---|
| 2,140,840 | Langer | Dec. 20, 1938 |
| 2,235,667 | Blount | Mar. 18, 1941 |

FOREIGN PATENTS

| | | |
|---|---|---|
| 217,800 | Switzerland | Mar. 2, 1942 |
| 421,689 | Great Britain | Dec. 28, 1934 |